(12) United States Patent
Takai (10) Patent No.: US 8,496,490 B2
(45) Date of Patent: Jul. 30, 2013

(54) CARD CONNECTOR

(75) Inventor: Yosuke Takai, Tokyo (JP)

(73) Assignee: Yamaichi Electronics Co., Ltd. (JP)

( * ) Notice: Subject to any disclaimer, the term of this patent is extended or adjusted under 35 U.S.C. 154(b) by 9 days.

(21) Appl. No.: 13/361,767

(22) Filed: Jan. 30, 2012

(65) Prior Publication Data

US 2012/0220145 A1    Aug. 30, 2012

(30) Foreign Application Priority Data

Feb. 24, 2011   (JP) .................................. 2011-038426

(51) Int. Cl.
*H01R 13/62*     (2006.01)
(52) U.S. Cl.
USPC ........................................................ 439/159
(58) Field of Classification Search
USPC ........................ 439/159, 160, 325, 541.5, 630
See application file for complete search history.

(56) References Cited

U.S. PATENT DOCUMENTS

| 5,643,001 A * | 7/1997 | Kaufman et al. ............. 439/159 |
| 6,402,529 B2 * | 6/2002 | Saito et al. ...................... 439/74 |
| 6,568,960 B2 * | 5/2003 | Bricaud et al. ................ 439/630 |
| 7,083,441 B1 * | 8/2006 | Lee ............................... 439/148 |
| 7,094,097 B2 * | 8/2006 | Cheng et al. ............... 439/541.5 |

FOREIGN PATENT DOCUMENTS

| JP | 2004-206963 A | 7/2004 |
| JP | 2006-172768 A | 6/2006 |

* cited by examiner

*Primary Examiner* — Khiem Nguyen
(74) *Attorney, Agent, or Firm* — Studebaker & Brackett PC (57) ABSTRACT

A card connector for accommodating either of a first card and a second card with the different size from the first card, includes: contacts including first contacts for the first card and second contacts for the second card; a partition plate which partitions a card accommodation space up and down; and an eject mechanism including an eject member which slides in the card connector in a front-back direction, a card contacting member coupled to the ejected member and having a first card pressing surface that abuts on the first card, and a movable metal member attached to the card contacting member and having a second card pressing surface that abuts on the second card and that is moved between a first position and a second position.

5 Claims, 8 Drawing Sheets

CARD CONNECTOR

This application claims priority from Japanese Patent Application No. 2011-038426, filed on Feb. 24, 2011, the entire contents of which are hereby incorporated by reference.

FIELD OF THE INVENTION

The present disclosure relates to a card connector, and more particularly to a card connector which can attach various types of card thereto.

DESCRIPTION OF RELATED ART

In electronic apparatuses and information terminal apparatuses, it has been known that an integrated circuit card (hereinafter simply referred to as a "card") for CPU or memory is attached usually through a card connector in order to enhance the functions of their apparatuses. On the other hand, as the cards to be attached, have emerged various types of cards which are different in size, shape, or arrangement of external contact points. In association with such the wide variety of emerging cards, a card connector is demanded into which many types of cards can be selectively attached.

As such the card connector, for example, Japanese Patent. Application Publication No. JP-A-2006-172768 discloses a card connector including a partition member which divides a connector housing formed by a connector body and a cover into two sections up and down. By this partition member, an upper slot into which a first card is inserted, and a lower slot into which a second card is inserted are formed in the connector housing. In the card connector, in order to discharge the attached first card or second card from the card connector, a first eject mechanism and a second eject mechanism are provided for the respective slots.

Further, Japanese Patent Application Publication No. JP-A-2004-206963 discloses a card connector including, similarly to in JP-A-2006-172768, a partition member which divides a connector housing formed by a connector body and a cover into two sections up and down, in which a secure digital (SD) card and a Memory Stick Duo (registered trade mark) card can, be selectively attached. An eject mechanism of this card connector includes a card, presser which is located on an upper stage of the housing and engages with a front end surface of the SD card, and a protrusion part which is located on a lower stage of the housing, protrudes from the lower portion of the card presser, and abuts on a front end surface of the Memory Stick Duo (registered trade mark) card. The protrusion part protrudes more forward (to the card insertion slot side) than the card presser in order to make the protruding amount of a card rear end surface from the card connector equal between the SD card and the Memory Stick Duo (registered trade mark) card when the SC card or the Memory Stick Duo card has been attached into the, card connector.

In the card connector disclosed in JP-A-2006-172768, the eject mechanisms are provided respectively for the upper and lower slots of the connector housing. Therefore, the height of the connector increases, so that it is difficult to satisfy a demand of card connector height-down in connection with recent, downsizing of the electronic apparatuses. Further, this card connector increases the number of parts, thereby to cause an increase in a manufacturing cost.

In the card connector disclosed in JP-A-2004-206963, the eject mechanism is unified. Therefore, the number of parts decreases and the height of the connector can be reduced. However, in order to prevent the protrusion part which abuts on the front end surface of the Memory Stick Duo (registered trade mark) card from interfering with the partition plate and the housing bottom surface, clearance gaps are formed between the protrusion part and the partition plate, and between the protrusion part and the housing bottom surface. Therefore, the protrusion part becomes low in height and thus abuts on only a part of the front end surface of the card, so that abutment between the card and the protrusion part is prone to be released when the card is inserted or discharged. If the abutment between the card and the protrusion part is released, the front end of the card enters into the gap clearance between the protrusion part and the partition plate or between the protrusion part and the housing bottom surface, so that there is fear that proper insertion or discharge of the card is obstructed, or that the card and the eject mechanism are damaged.

SUMMARY OF INVENTION

Illustrative aspects of the present invention provide a card connector capable of overcoming the above-mentioned disadvantageous.

According to a first aspect of the invention, a card connector in which a base and a cover form a card accommodation space having a card insertion slot and in which either of a first card and a second card is selectively accommodated in the card accommodation space, includes: a plurality of contacts including a plurality of first contacts for the first card and a plurality of second contacts for the second card; a partition plate configured to partition the card accommodation space up and down, and to be moved upward and downward in the card accommodation space in response to insertion and discharge of the first card; and an eject mechanism provided movably in the card connector in the front-back direction, wherein: the eject mechanism includes at least an eject member configured to slide in the card connector in the front-back direction, a card contacting member which is coupled to the ejected member and has a first card pressing surface that abuts on a front end surface of the first card, and a movable metal member which is attached to the card contacting member and has a second card pressing surface that abuts on a front end surface of the second card; the second card pressing surface is arranged at the rear of the first card pressing surface; the second card pressing surface is configured to be moved between a first position of a up-position and a second position of a down position in response to moving down and moving-up of the partition plate caused by inserting and discharging of the first card; and the movable metal member, when the second card pressing surface is located in the first position, is formed so as to cover at least a part of the first card pressing, surface.

Other aspects and advantages of the invention will be apparent from the following description, the drawings and the claims.

BRIEF DESCRIPTION OF THE DRAWINGS

FIGS. 3A and 3B are sectional views showing that a first card, is attached into the card connector in FIG. 1, in which FIG. 3A shows a momentary state where a front surface of the first card has come into contact with a card presser, and FIG. 3B shows a state where the first card had been attached to a predetermined position.

FIGS. 4A and 4B are sectional views showing that a second card is attached into the card connector in FIG. 1, in which FIG. 4A shows a momentary state where a front surface of the second card has come into contact with a card pressing piece of a movable metal member, and FIG. 4B shows a state where the second card has been attached to a predetermined position.

FIGS. 6A and 6B are exploded views of the eject mechanism in FIG. 5, in which FIG. 6A is a main portion enlarged perspective view of an eject member, and FIG. 6B is an enlarged perspective view of the movable metal member.

DETAILED DESCRIPTION OF EXEMPLARY EMBODIMENTS

With reference to drawings, an exemplary embodiment of a card connector according to the invention will be described below in detail.

In the description below, the terms "left" and "right" refer to the +x direction and the −x direction in the coordinate system shown in FIG. 1, respectively. The terms "front" and "rear" refer to the +y direction and the −y direction shown in FIG. 1, respectively. The terms "upward" and "downward" refer to the +z direction and the −z direction shown in FIG. 1, respectively.

A card connector 1 according to the embodiment is such that a first card 110 and a second card 120 which are two types of IC cards with different sizes from each other can be attached and either of the two cards can be selectively attached.

Figure 7:
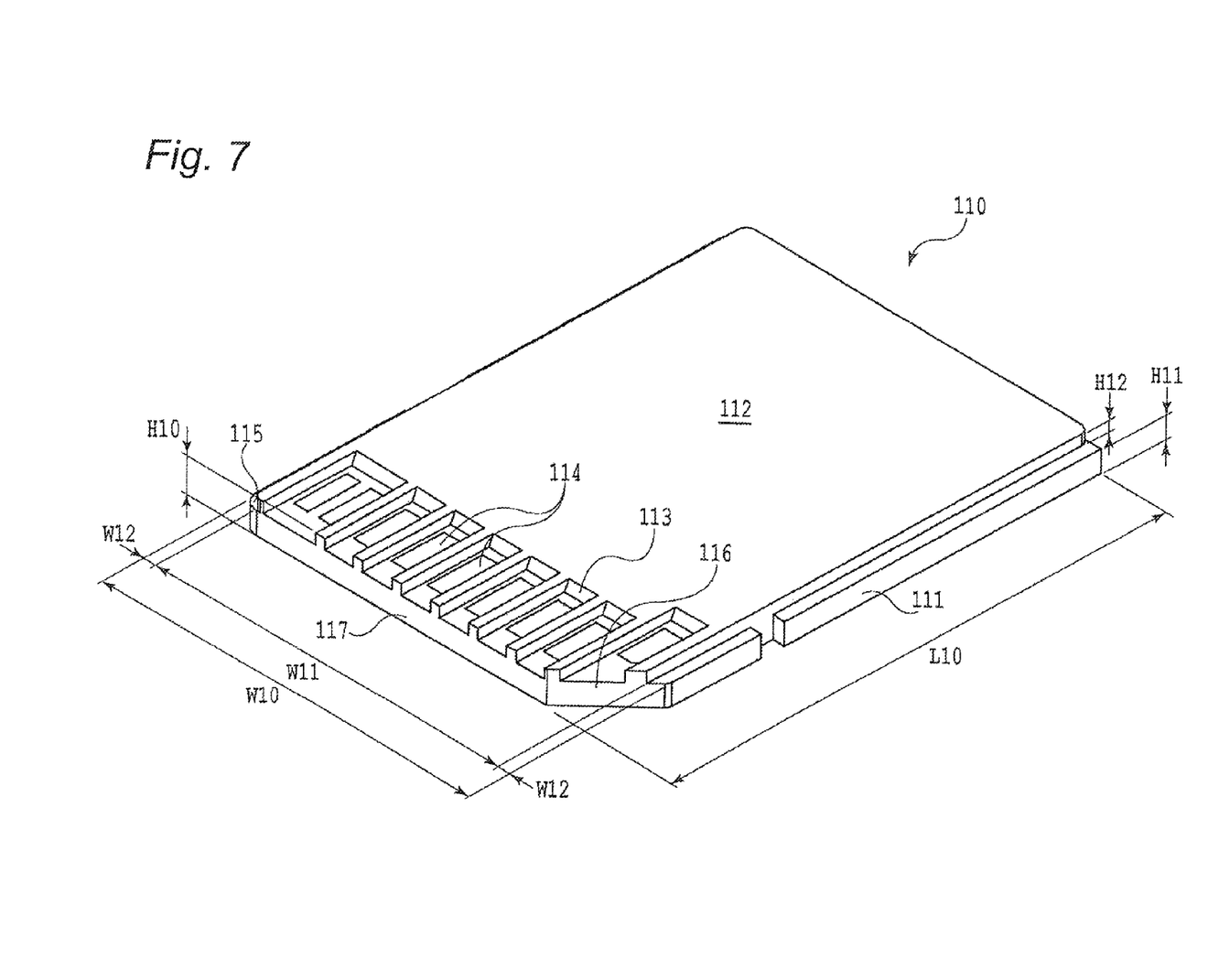
FIG. 7 is a perspective view of the first card used in the card, connector of FIG. 1.

FIG. 7 is a diagram showing a state where the first card 110 such as a secure digital (SD) card is turned upside down (hereinafter referred to as a "reverse state"). The first card 110 is generally rectangular in horizontal section, and includes an upper body 111 and a lower body 112. In the lower body 112, plural grooves 113 are formed, each of which opens forward and downward and has a pad 114 as an external contact point on a bottom surface of each of the grooves 113. The first card 110 has the structure that a width (W10) of the upper body 111 is larger than a width (W11) of the lower body 112. Accordingly, the first card 110 has the shape in which laterally opposite sides thereof are formed into a stepped shape through step parts 115. In the embodiment, the first card 110 is attached into the card connector 1 in a reverse state, that is, in a state where a surface (rear surface) on which the pads 114 are formed faces upward. In FIG. 7, a reference numeral 116 is an inclined surface as a notch part formed at a front corner portion of the card, and a reference numeral 117 is a card front end surface which becomes a front surface of the card 110 when the first card 110 is properly inserted into a card accommodating space of the card connector 1. Further, L10 represents a length in a front-back direction of the first card 110, W2 represents a width of each step part 115 formed on the right and left sides of the card, H10 represents a whole height (thickness) of the first card 110, and H11 and H12 represent a height of the upper body 111 and a height of the lower body 112, respectively.

Figure 8:
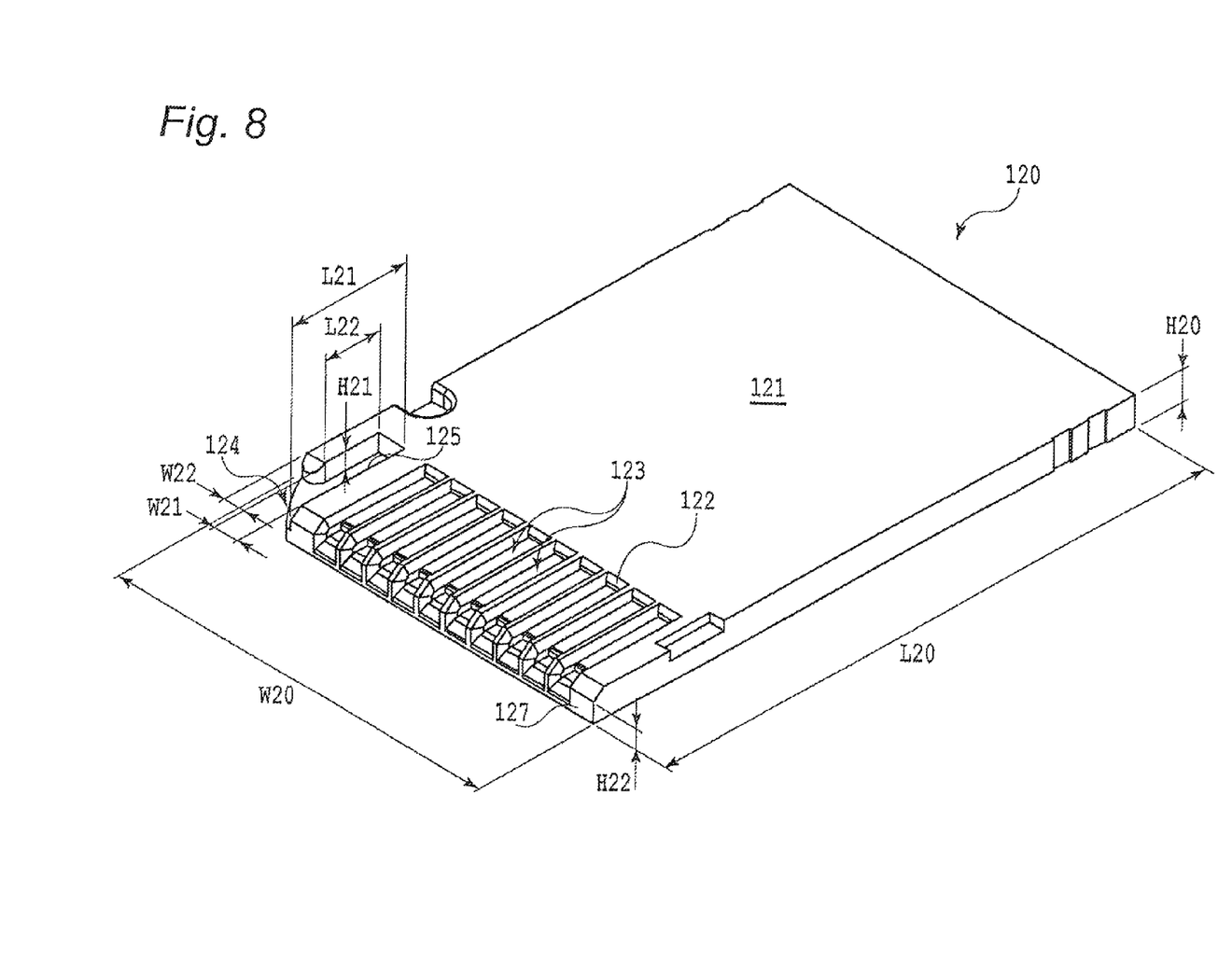
FIG. 8 is a perspective view of the second card used in the card connector of FIG. 1.

The second card 120, as shown in FIG. 8, is smaller than the first card 110 in length, width and height, such as a Memory Stick Duo (registered trade mark). In the embodiment, the second card 120 includes a main body 121 which is generally rectangular in horizontal section. In the main body 121, plural grooves 122 are formed, each of which opens forward and downward and has a pad 123 as an external contact point on a bottom surface of each of the grooves 122. The second card 120 in the embodiment has a length of L20, a width of W20, and a height (thickness) of H20. The width of the second card 120 is smaller than the width W10 of the upper body 111 of the first card 110 and also smaller than the width W11 of the lower body 112 thereof. The second card 120 in the embodiment is attached into the card connector 1 in a normal state where a surface on which the pads 123 are formed (rear surface) faces downward (in a state turned up from the state shown in FIG. 8). Further, in FIG. 8, a reference numeral 124 is an inclined surface as a notch part formed at a front corner portion of the card. A reference numeral 125 is a dummy groove which opens forward and downward in response to the inclined surface 124. Further, a reference numeral 127 is a card front end surface which becomes a front surface of the card 120 when the second card 120 is properly inserted into the card accommodating space of the card connector 1. Further, W21 represents a width of the dummy groove 125 and W22 represents a distance of the dummy groove 125 from the card side surface. L21 represents a depth (length in the front-rear direction) of the dummy groove 125 on the center side in the right-left direction, and L22 represents a depth of the dummy groove 125 on the lateral surface side. H21 represent a depth (length in the up-down direction) of the dummy groove 125. Further, H22 represents a height (length in up-and-down direction) of a vertical portion of the front end surface 127 of the second card 120.

Next, the structure of the card connector 1 according to the embodiment will be described with reference to FIG. 1. The, card connector 1 generally includes a base 10, a cover 8 (refer to FIGS. 2 to 4B), a partition plate 41, a lock bracket 50, an actuator 60, a plurality of contacts 80 and 90, and an eject mechanism 20. The card connector 1, in the embodiment may further include a write protect switch 70 and a card recognition switch 75.

The cover 8 is formed by press working of punching and bending a thin metal plate. Generally, the cover 8 includes a top plate 8a, and right, and left sidewalls (not shown), and has a substantially inverted-U vertical cross section. In the right, and left sidewalls of the cover, a plurality of attaching holes are formed, and engage with a plurality of projections 19 formed on right and left sidewalls 13 and 14 of the base 10 described later to form the card connector 1. Namely, by attaching the cover 8 to the base 10, the cover 8 forms an IC card accommodation space having a card insertion slot 5 which is opened rearward.

The base 10 includes a bottom wall 11, a front wall 12, and right and left sidewalls 13 and 14, is generally box-shaped, and is formed of plastic which is electrically insulated. Further, a component including a second contact 90 and a pushup spring 49 (refer to FIG. 2) is embedded in the bottom wall 11 of the base 10 by insert molding.

A plurality of through-holes 12a extending through the front wall 12 in a front-back direction are formed in the upper portion of the front wall 12 of the base 10. A plurality of first contacts 80 corresponding to the plural pads 114 of the first card 110 are pressed respectively into the through-holes 12a. The plural first contacts 80, so that their contact;points 81 can be displaced upward and downward, are supported by the front wall 12 like cantilevers. The contact point 81 of each contact 80 is formed, projecting like a circular arc, and is supported so that the circular arc-like projecting part is directed downward.

Paired guide paths along which the two types of cards 110 and 120 having the different widths are guided into the card accommodation space are formed in the right and left sidewalls 13 and 14 of the base 10. In the embodiment, on the respective sides facing the card accommodation space, of the right and left sidewalls 13 and 14, there are formed paired upper-stage guide paths 15, paired middle-stage guide paths 16 and paired lower-stage guide paths 17. The upper-stage guide paths 15, the paired middle-stage guide paths 16 and the paired lower-stage guide-paths 17 are each perpendicular to the bottom wall 11 and are formed in parallel to one another. Between the two adjacent guide paths, each step is formed.

The width between the paired upper-stage guide paths 15 formed in the right and left sidewalls 13 and 14 is substantially the same as or slightly larger than the width W11 of the lower body 112 of the first card 110. Further, the width between the paired middle-stage guide paths 16 is substantially the same as or slightly larger than the width W10 of the upper body 111 of the first card 110. Further, the total of the heights of the upper-stage guide path 15 and the middle-stage guide path 16 is substantially the same as or slightly larger than the height H10 of the first card 110. The first card 110 in the reverse state is guided and inserted into the card accommodation space by the upper-stage guide path 15 and the middle-stage guide path 16. The width between the paired lower-stage guide paths 17 is substantially the same as or slightly larger than the width W20 of the second card 120. Further, the height of the lower-stage guide path 17 is smaller than the height of the second card 120. Since the height of the second card 120 is larger than the height, of the lower-stage guide path 17, the second card 120 is guided and inserted, in a state where a part thereof protrudes between the middle-stage guide paths 16, into the card accommodation space by the lower-stage guide path 17. Thus, the card accommodation space of the first card 110 and the card accommodation space of the second card 120 overlap with each other. Therefore, in case that one card is accommodated, the other card cannot be accommodated, with the result, that simultaneous insertion of the cards can be prevented. Further, by the overlapping, card accommodation spaces, the height of the card connector 1 can be reduced.

At rear portions of the right and left sidewalls 13 and 14 of the base 10, paired lock brackets 50 are provided. The paired lock brackets 50 are bilaterally symmetrically arranged in rear accommodation grooves 13a and 14a formed on the respective rear sides (that is, n the card insertion slot 5 side) of the right and left sidewalls 13 and 14, so as to be opposed to each other.

In the front portion of the bottom wall 11 of the base 10, the plural second contacts 90 are arranged in parallel with one another in response to the plural pads 123 which are the external contact points of the second card 120. The plural second contacts 90 are supported respectively by the bottom wall 11 like cantilevers. In the embodiment, the predetermined portions of the plural second contacts 90 are insert-molded into the bottom wall 11 although this point is not limited.

Next, the paired lock brackets will be described. The paired lock brackets 50 have the same shape, and only the left lock bracket 50 arranged in tile rear accommodation groove 14a in the left sidewall 14 will be described here.

The lock bracket 50 includes an elastic deformation piece 51, arranged on the card accommodation space side (inner side) of the rear accommodation groove 14a, and a fixed piece 53 arranged on the side (outside) fair from the card accommodation space thereof. The elastic deformation piece 51 and the fixed piece 53 are parallel to each other, and connected to each other at their rear portions so as to have a substantially U-shaped horizontal cross section. In the vicinity of the rear-side portion of the elastic deformation piece 51 connected to the fixed piece 53, a contact part 52 is provided, which protrudes into the card accommodation space from an opening part (not shown) formed: in the middle-stage guide path 16 of the left sidewall 14 in the vicinity of the card insertion slot 5. On a front free end side of the elastic deformation piece 51, an opening 54 is formed, with which a projecting pin 62 of an actuator 60 described later (only the right-side projecting pin 62 is shown in FIG. 1) engages. Specifically, the lock bracket 50 is formed by press working of punching a thin metal plate to obtain an elongate plate-shaped body and then folding the obtained elongate plate-shaped body. In the lock bracket 50, the fixed piece 53 thereof is pressed and fixed into the rear accommodation groove 14a of the left sidewall 14. The rear accommodation groove 14a is formed so as to communicate with the card accommodation space as a whole, within an area from the groove 14a portion corresponding to the opening 54 in the elastic deformation piece 51 to a partition wall 14b. Accordingly, the paired upper-stage guide paths 15, the paired middle-stage guide paths 16, and the paired lower-stage guide paths 17 extend from the card insertion slot 5 to a position immediately in front of the groove 14a portion corresponding to the opening 54 in the elastic deformation piece 51.

In front of the rear accommodation groove 13a in the right sidewall 13 of the base 10, a front accommodation groove 13c is formed through a partition wall 13b. In the front accommodation groove 13c in the right sidewall 13, the write protect switch 70 and the card recognition switch 75 are arranged, which are formed so as to partially protrude into the card accommodation space.

In front of the rear accommodation groove 14a in the left sidewall 14 of the base 10, a front accommodation groove 14c is formed through the partition wall 14b. In the front accommodation groove 14c in the left sidewall 14, an eject mechanism 20 is arranged to assist attachment of the IC cards 110 and 120 into the card accommodation space and discharge of the cards 110 and 120 from the card accommodation space.

The eject mechanism 20 in the embodiment is provided with a conventional well-known push-push type eject mechanism. Specifically, the eject mechanism 20 in the embodiment generally includes a cam layer 21, an eject member 24, a compression coil spring 29, and a card contacting member 25.

Figure 6A:
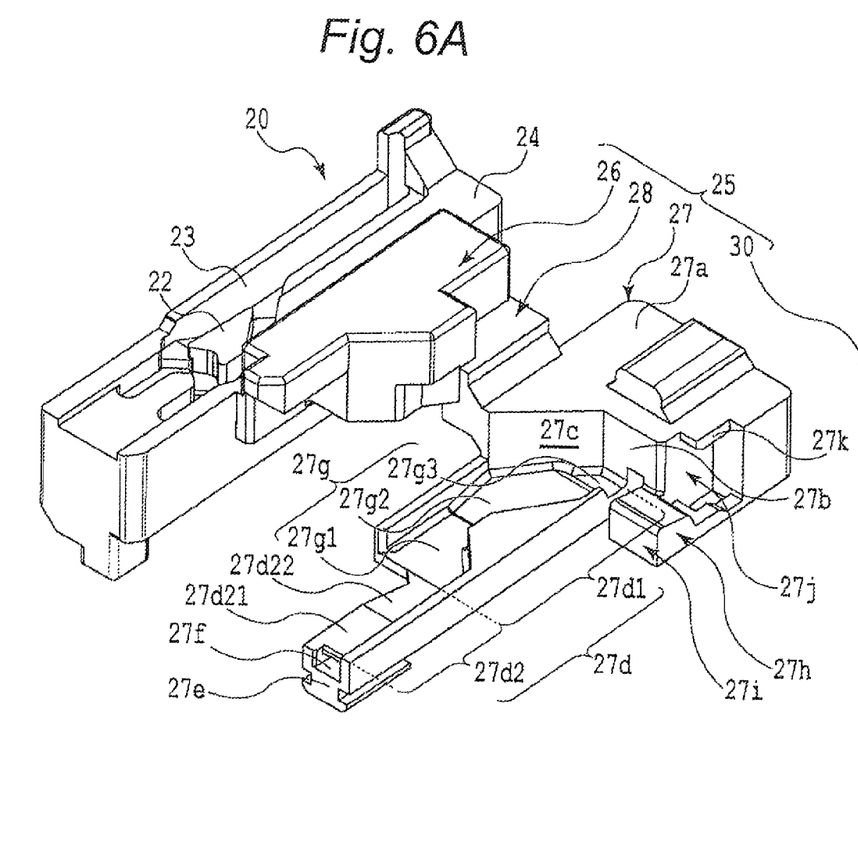

The cam lever 21 functions as a cam follower having one end supported swingably by the partition wall 14b and the other end guided to a cam groove 23 formed in the eject member 24. On the top surface of the eject member 24, as shown in FIG. 6A in detail, a heart cam 22 and the cam groove 23 are formed. The eject ember 24 is accommodated in the front accommodation groove 14c so as to move slidably in the front accommodation groove 14c formed in front of the partition wall 14b of the left sidewall 14 in the front-back direction. The compression coil spring 29 is arranged on the front side in the front accommodation groove 14c in the left sidewall 14 to urge the eject member 24 rearward.

Figure 5:
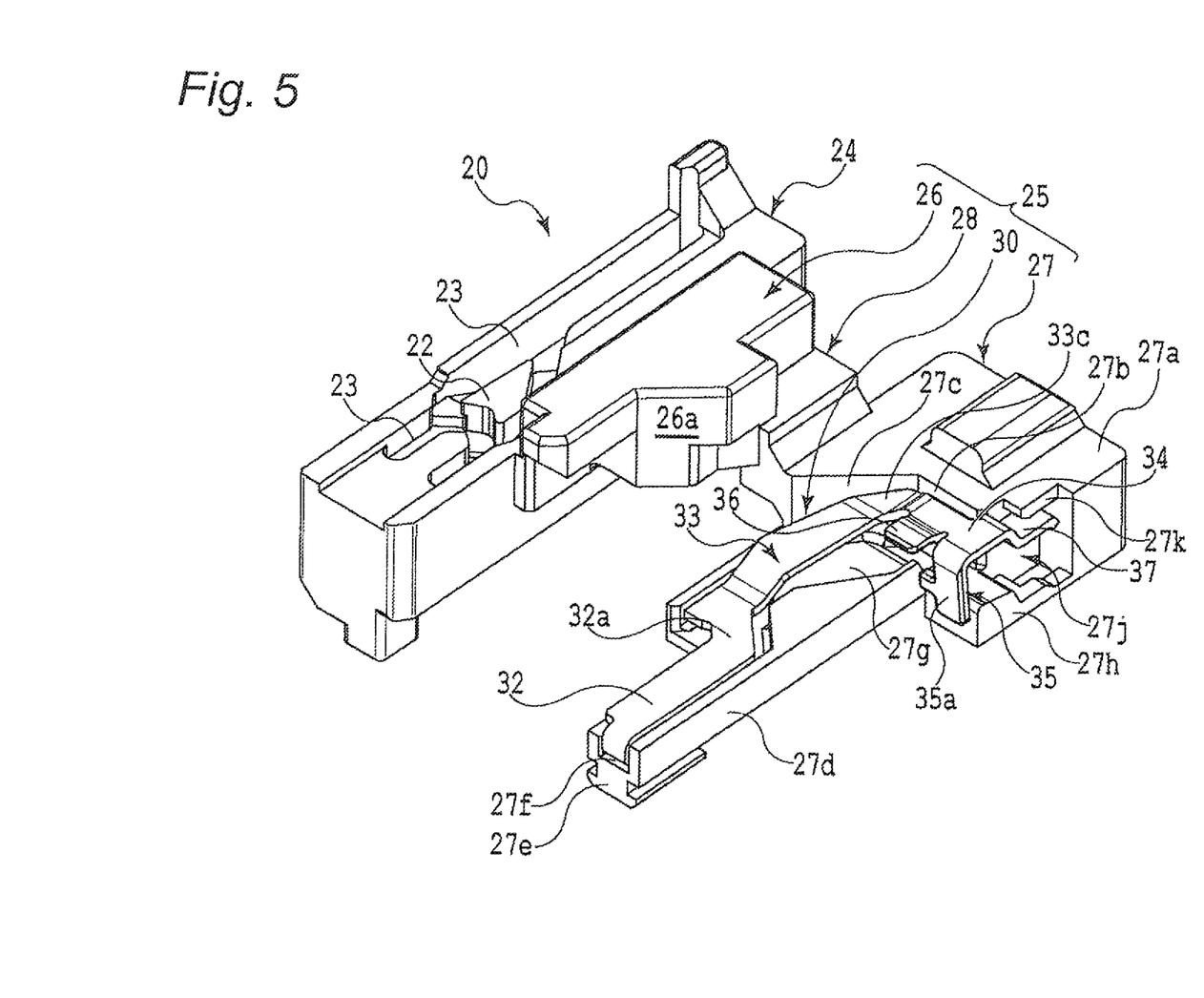
FIG. 5 is a main portion enlarged perspective view of an eject mechanism of the card connector in FIG. 1.

The card contacting member 25 by which the invention is characterized most will be described in detail with reference to FIGS. 5, 6A, and 6B. In the embodiment, the card contacting member 25, as shown in FIG. 5, includes a first card contacting member 26 connected to the eject member 24, a second card contacting member 27 and a movable metal member 30. Both of the first and second card contacting members 26 and 27 are formed so as to protrude into the card accommodation space.

The first card contacting member 26 is connected to the eject member 24 and formed so as to protrude in the right direction from the eject member 24, that is, into the card accommodation space. The first card contacting member 26 is arranged above the eject member 24. The first card contacting member 26, as shown in FIGS. 6A and 7, has an inclined surface 26a abutting on the inclined surface 116 of the notch part formed on the first card 110. The first card contacting member 26 in the embodiment, as shown in FIGS. 1 and 2, when the card is not inserted, is arranged above the partition plate 41 described later.

The second card contacting member 27, as shown in FIG. 6A, is connected through a connection part 28 to the lower portion of the eject member 24. Further, the second card contacting member 27 is arranged on the right-side lower portion of the first card contacting member 26. The second card contacting member 27 is provided so as to be arranged below and in the front of the partition plate 41 as shown in FIGS. 1 and 2, when the card is not inserted. More specifically, the connection part 28 extending from the eject member 24 into the card accommodation space includes a horizontal portion formed so as to stride over a spring receiving part 43 of the partition plate 41.

The second card Contacting member 27 includes a main body 27a and a supporting body 27d. An upper surface of the main body 27a of the second card contacting member 27 is substantially parallel to the upper surface of the bottom wall 11 of the base 10, and is formed horizontally so as to be located in the substantially same plane as the lower surface of the partition plate 41. Further, a lower surface of the main body 27a of the second card contacting member 27 is parallel to the upper surface of the member 27, and formed so as to be capable of sliding: along the upper surface of the bottom wall 11 of the base 10 in the front-back direction. The height (distance between the upper surface and the lower surface) of the main body 27a is set so as to become substantially equal to the thickness H20 of the second card 120.

A front end surface 27n of the main body 27a constituting the second card contacting member 27 is formed so as to make a right angle with the bottom wall 11 of the base 10 and become parallel to the front wall 12 of the base 10.

The main body 27a constituting the second card contacting member 21 includes an inclined surface 27c abutting on the inclined, surface 116 of the notch part formed on the first card 110. The inclined surface 27c is further formed so as to be located in the same plane as the inclined surface 26a formed on the first card contacting member 26.

The main body 27a further includes a first, card pressing surface 27b which abuts on the front end surface 117 of the first card 110. The first card pressing surface 27b is formed on the right side of the above inclined surface 27c adjacently to the inclined surface 27c. The first card pressing surface 27b is provided for the second contactor 27 so as to make a right angle with the bottom wall 11 of the base 10 and become parallel to the front wall 12. The first card pressing surface 27b, when the first card 110 abuts oh the first card pressing surface 27b, functions as a main element for moving the eject member 24 against the compression spring 29.

The main body 27a is provided with a receiver 27h which is formed on the right side of the above first card pressing surface 27b adjacently to the first card pressing surface 27b and which protrudes rearward. The receiver 27h includes a slide surface 27i on which a contacting piece 35 constituting the movable metal member 30 described later slides in contact with. The slide surface 27i forms a rear end surface of the receiver 27h, and is formed nearly in parallel to the above first card pressing surface 27b. The slide surface 27i is formed so as to be arranged behind the first card pressing surface 27b at a distance equal to a length obtained by subtracting a thickness t of the movable metal member 30 (contacting piece 35 of the movable metal member 30) from difference (L10-L20) in length between the first card 110 and the second card 120. By thus forming the slide surface 27i, even in case that the first card 110 or the second card 120 has been attached selectively into the card connector 1, the card backward protruding amounts from the card connector 1 becomes nearly the same between the cards 110 and 120. An upper surface of the receiver 27h extending forward from the upper end of the slide surface 27i is substantially horizontal, and thus substantially parallel to the lower surface of the second card contacting member 27. The upper surface of the receiver 27h is formed so that a moving piece 34 of the movable metal member 30 can abut on the receiver 27h as described later. The height from the lower surface of the main body 27a of the second card contacting member 27 to the upper surface of the receiver 27h is set so that the distance from the lower surface of the top plate 8a of the cover 8 to the upper surface of the receiver 27h become substantially the same as or slightly larger than a length obtained by adding the thickness t of the movable metal member 30 (the thickness t of the moving piece 34) to the thickness H10 of the first card 110. The height up to the upper surface of the receiver 27h is lower than the height of the main body 27a, and thus can be set enough smaller than the thickness H20 of the second card 120. In the embodiment, in a front position; continuing to the horizontal upper surface of the receiver 27h, there is formed a displacement space 27j where an engaging piece 37 of the movable metal member 30 moves up and down. Above the space 27j, a stopper 27k is provided, which prevents the movable metal member 30 from excessively moving upward.

The supporting body 27d constituting the second card contacting member 27 is a member for mainly supporting the movable metal member 30 so that the movable metal member 30 is elastically deformable. The supporting body 27d includes a front part 27d1 and a rear part 27d2. The front part 27d1 of the supporting body 27d is formed, with slight space from the above receiver 27h, protruding rearward from the left-side rear downside of the main body 27a, that is, from partial downsides of the inclined surface 27c and the first card pressing surface 27b in parallel to the receiver 27h.

The rear part 27d2 of the supporting body 27d, as shown in FIG. 6A, extends further backward along a right side surface of the front part 27d1. The Tear part 27d2 is smaller in width (length in the right and left direction) than the front part 27d1, and has the width slightly smaller than the width W21 of the dummy groove 125 formed in the rear surface of the second card 120. Further, the height, from the lower surface of the rear part 27d2 is set smaller than a length obtained by subtracting the thickness t of a supporting, piece 32 of the movable metal member 30 described later from the depth H21 of the dummy groove 125. Further, a length of the rear part 27d2 extending from the rear end of the front part 27d1 is set so as to become substantially equal to the depth L22 on the lateral side of the dummy groove 125 of the second card 120. By thus constitution the rear part 27d2 of the supporting body 27d, when the second card 120 has been inserted, the rear part 27d2 and the supporting piece 32 of the movable metal member 30 are accommodated in the dummy groove 125 of the second card 120. The lower surface of the supporting body 27d including the front part 27d1 and the rear part 27d2 is formed flush with the, lower surface of the main body 27a, and formed slidably in the front-back direction along the upper surface of the bottom wall 11 of the base 10 together with the main body 27a.

In the front part 27d1 of the supporting body 27d, a C-shaped groove 27g is formed, which is formed nearly in the C-shape in top view and opens upward and rearward. The bottom surface of the C-shaped groove 27g is formed by a horizontal inclined surface 27g1 extending substantially horizontally, and an inclined surface 27g2 which ascends forward from the horizontal surface 27g1. The more front bottom surface of the C-shaped grooved portion 27g is formed as a horizontal surface 27g3 along, the inclined surface 27c, and first pressing surface 27b of the main body 27a, which is formed so as to be opposed to the upper surface of the receiver 27h of the main body 27a in the right and left direction. It is understood that the shape of the C-shaped groove 27g formed in the front part 27d1 of the supporting body 27d, as shown in FIGS. 5, 6A and 6B, is substantially the same as the shape of the movable metal member 30.

The rear part 27d2 of the supporting body 27d includes a rear end surface 27e having a press-in hole 27f into which a fixing piece 31 constituting the movable metal member 30 described later is pressed. The rear end surface 27e is formed substantially in parallel to the first card pressing surface 27b. The press-in hole 27f opens rearward, and extends in the front-back direction in the rear part 27d2 of the supporting body 27d by a length substantially equal to the length of the above fixing piece 31. The upper surface of the rear part 27d2 of the supporting body 27d is formed, on the rear side, as a horizontal surface 27d21 extending forward from an upper end of the rear end surface 27e horizontally, and formed, on the front side, as an inclined surface 27d22 descending forward. The inclined surface 27d22 formed at the rear part 27d2 of the supporting member 27d continues to the bottom surface of the substantially C-shaped groove 27g formed, in, the front part 27d1 of the supporting body 27d.

Next, the movable metal, member 30 constituting the card contacting member 25 according to the invention will be described. The movable metal member 30 has a function of, with the selective card attachment, in cooperation with the second card contacting member 27, sorting the attached card into the first card pressing, surface 27b on which the first card 110 abuts or into a second card pressing surface 35a on which the second card 120 abuts.

Figure 6B:
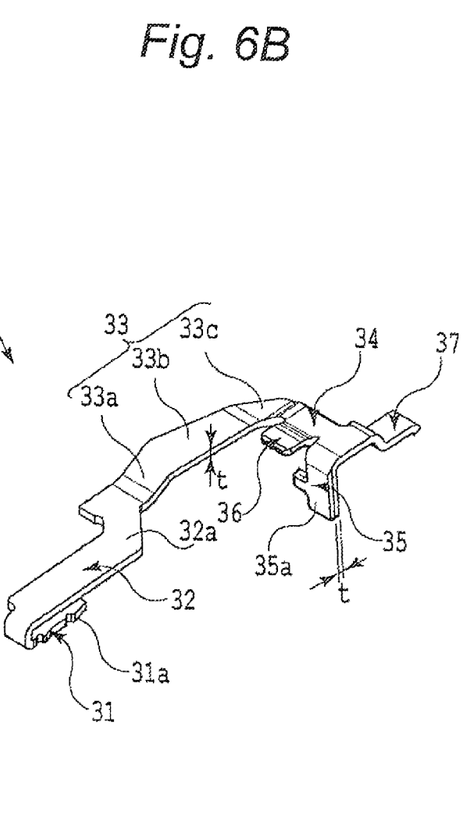

The movable metal member 30, as shown in FIG. 6B in detail, is substantially C-shaped in top view, and includes the fixing piece 31, the supporting piece 32, an elastic deformation piece 33, the moving piece 34, and the contacting piece 35. The movable metal member 30 is formed by punching out a thin metal plate having the thickness t to a desired shape and bending the punched-out plate by press working.

The fixing piece 31 constituting the movable metal member 30 has plural engaging pawls 31a formed on right and left side surfaces thereof, and extends horizontally in the front-back direction. The supporting piece 32 is bent at the rear end portion of the fixing piece 31 at an angle of 180°, and extends in parallel to the fixing piece 31 and horizontally in the front direction. By thus forming, the fixing piece 31 and the supporting piece 32, the fixing piece 31 is pressed into the press-in hole 27f, and the supporting piece 32 comes close contact with the, horizontal surface 27d21 formed at the fear part 27d2 of the supporting body 27d. Hereby, the movable metal member 30 is fixed to the supporting body 27d of the second contactor 27. In the embodiment, the front portion of the supporting piece 32, since the inclined surface 27d22 formed at the rear part 22d2 of the supporting body 27d slants forward, is arranged apart from the upper surface of the supporting body 27d. Further, the width (length in the right and left direction) of the supporting piece 32 is substantially the same as the width of the rear part 27d2 of the supporting body 27d, and accordingly is slightly smaller than the width W21 of the dummy groove 125 formed in the rear surface of the second card 120.

The elastic deformation piece 33 constituting the movable metal member 30 is formed in front of the supporting piece 32. The elastic deformation piece 33 is connected to the supporting piece 32 through a connecting part 32a extending horizontally from the front end of the supporting piece 32 diagonally forward left, and supported by the supporting piece 32. The elastic deformation part 33, since it is formed in response to the inclined surface 124 formed at the corner portion of the second card 120, can prevent deformation of the elastic deformation piece 33 due to interference with the second card 120. The elastic deformation piece 33 includes an inclined part 33a which ascends from the front end of the connecting part 32a forward, and a horizontal part 33b which continues to the inclined part 33a and extends horizontally from the front end of the inclined part 33a forward. The inclined part 33a and the horizontal part 33b are formed by being bent, at the front end of the connecting part 32a and at the front end of the inclined part 33a at desired angles. At least the inclined part 33a of the movable metal member 30, under a state shown in FIG. 2 where the card has not been inserted, is formed so as to be arranged below the partition plate 41. The inclined surface 33a and the horizontal part 33b are respectively arranged, with spacing, above the horizontal surface 27g and inclined surface 27g2 constituting the bottom surface of the C-shaped groove 27g formed in the front part 27d1 of the supporting body 27d of the second contactor 27 (refer to FIG. 5). The elastic deformation piece 33, by having such the constitution, when the partition plate 41 moves down, is deformable downward with the vicinity of the front end of the connecting part 32a as a supporting point.

The moving piece 34 constituting the movable metal member 30 is formed through a connecting part 33c in front of the elastic deformation part 33 so as to extend horizontally in the left and right direction. The moving piece 34 and the elastic deformation piece 33, as shown in FIG. 6B, are formed so as to form a substantially right angle with each other, and formed so as to cover the inclined surface 27c and the first card pressing surface 27b which are formed on the main body 27a, seen from the rear side (refer to FIGS. 2 and 5). The moving piece 34 can be deformed up and down by the deformation of the elastic deformation piece 33. The moving piece 34 is formed so as to be located, in a state shown in FIG. 2 where the card is hot inserted, between the main body 27a of the second card contacting member 27 and the partition plate 41 and on nearly the same level with the partition plate 41.

The contacting piece 35 constitution the movable metal member 30 is formed on the fear side of a leading end portion (right-side end portion) of the moving piece 34 by being bent downward so as to form a right angle with the moving piece 34. Hereby, a vertical surface of the contacting piece 35 arranged rearward functions as the second card pressing surface 35a abutting on the front end surface 127 of the second card 120. The contacting piece 35 preferably extends to the slide surface 27i of the receiver 27h located below. The contacting piece 35 can be moved up and down together with the moving piece 34 by the deformation of the elastic deformation piece 33. In other words, the contacting piece 35, that is the movable metal member 30, when the card has not been inserted or when the second card 120 has been inserted, since the movable metal member 30 (the elastic deformation piece 33 of the movable metal member 30) does not deform, is located in a up-position as a first position. On the other hand, when the first card 110 has been inserted, the movable metal member 30 (the elastic deformation piece 33 thereof) is pressed down by the partition plate 41, whereby the contacting piece 35, that is, the movable metal member 30 is located in a down-position as a second position where the moving piece 34 comes into contact with the upper surface of the receiver 27h. Furthermore, the second card pressing surface 35a of the contacting piece 35 can move between the first position of the up-position and; the second position of the down-position. When the contacting piece 35 is located in the second position, the lower end portion of the contacting piece 35 is located so as not to interfere with the bottom wall 11 of the base 10. In the embodiment, when the second card 120 has been inserted the contacting piece 35 is located in the first position of the up-position, and therefore the front end surface 127 of the second card 120 can abut on the second card contacting surface 35a of the contacting piece 35 having the enough size (area). Hereby, the second card 120 can move surely the eject member 24. Further, also when the first card 110 has been inserted, the movable metal member 30 (moving piece 34 thereof) moves down to the second position, and therefore the first card 110 can abut on the first card contacting surface 27b having; the enough size (area). Hereby, the first card 110 can move surely the eject member 24. From these points, the first card pressing surface 27b formed on the main body 27a and the second card pressing surface 35a formed on the movable metal member 30 are, usually, that is, when the card is not inserted, not aligned with each other in the right-left direction, seen from the rear side, but are overlapping with each other in the up-down direction. That is, the movable metal member 30, when the second card pressing surface 35a is located in the first position, is formed so as to cover at least a part of the first card pressing surface 27b.

In the embodiment, an uplift preventing piece 36 constituting the movable metal member 30 is adjacent to the left side of the contacting piece 35 and formed on the rear side of the moving piece 34. The uplift preventing piece 36 is formed slightly more highly than the moving piece 34, and extends horizontally from the rear of the moving piece 34. This uplift preventing piece 36, when the second card 120 has been inserted and the card front end surface 127 of the second card 120 has abut on the second card pressing surface 35a of the contacting piece 35, comes into contact with the upper surface of the second card 120, thereby to prevent the uplift of the second card 120.

In the embodiment, an engaging piece 37 constituting the movable metal member 30 is further formed oh the front side of the front end portion (right-side end portion) of the moving piece 34. The engaging piece 37 is engaged with the stopper 27k provided for the main body 27a of the second card contacting member 27, thereby to regulate the upward movement of the movable metal member 30. The engaging piece 37, in the embodiment, is formed by being bent so as to be located below the moving piece 34, but may extend horizontally frontward on the same level with the moving piece 34.

Next, the partition plate 41 will be described, which sorts the attached IC card (in the embodiment, the first card 110 or the second card 120). The partition plate 41, generally, moves up and down in the card accommodation space located in front of a line joining the respective partition walls 13b and 14b of the right and left sidewalls 13 and 14, thereby to allow the IC cards with different sizes to be sorted and guided to an upper area and a lower area in the card accommodation space. When the partition plate 41, when the first card 110 is guided onto the partition plate 41, moved down and simultaneously moves the movable metal member 30 attached to the -second card contacting member 27 from the first position to the second position.

The partition plate 41 includes a pair of elongate spring receiving parts 42 and 43, a pair of driving pieces 44 and, 45, and a pair of regulation pieces 46 and 47.

Figure 1:
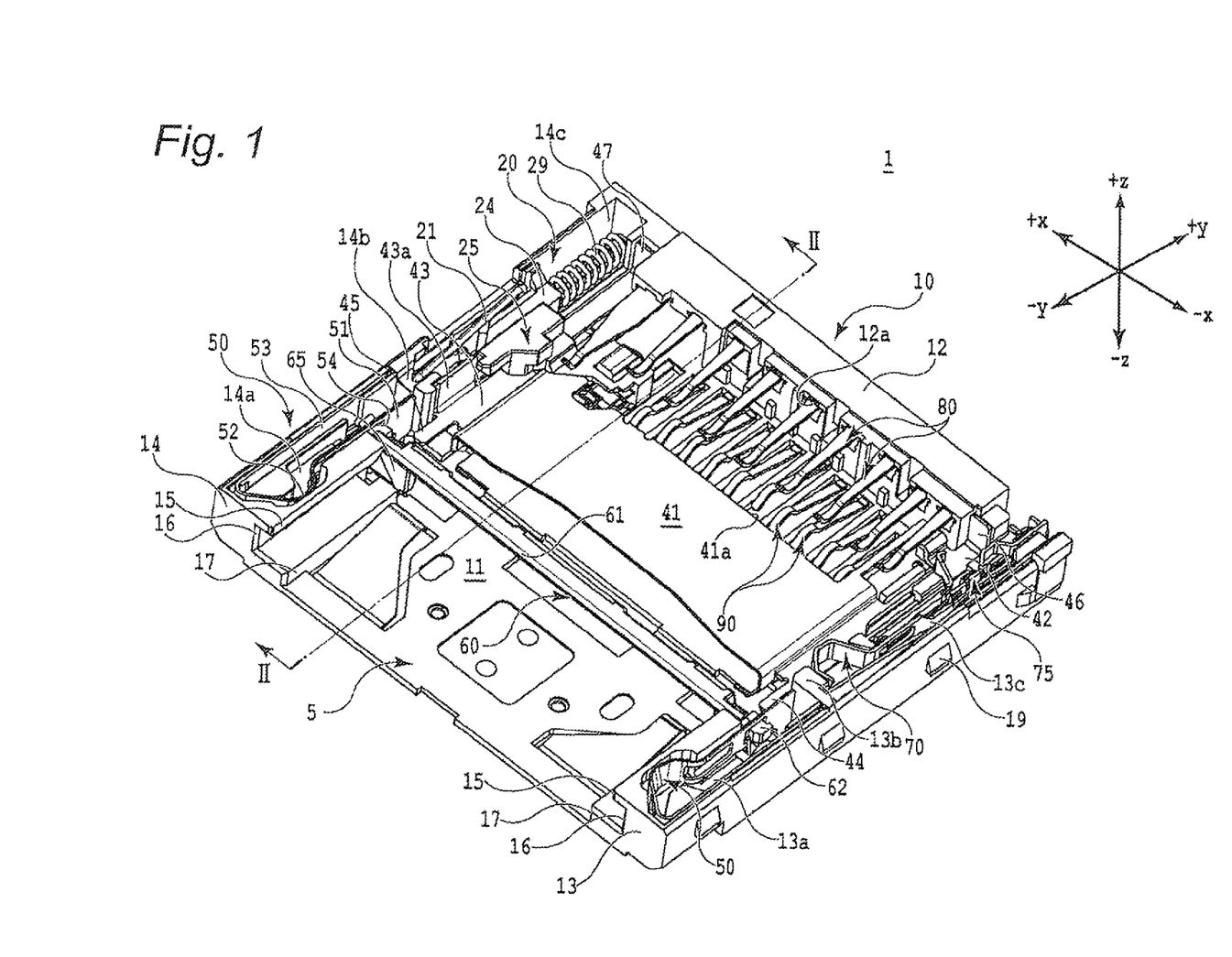
FIG. 1 is a perspective view of a card connector according to the invention, in a state where a cover is detached.
Figure 2:
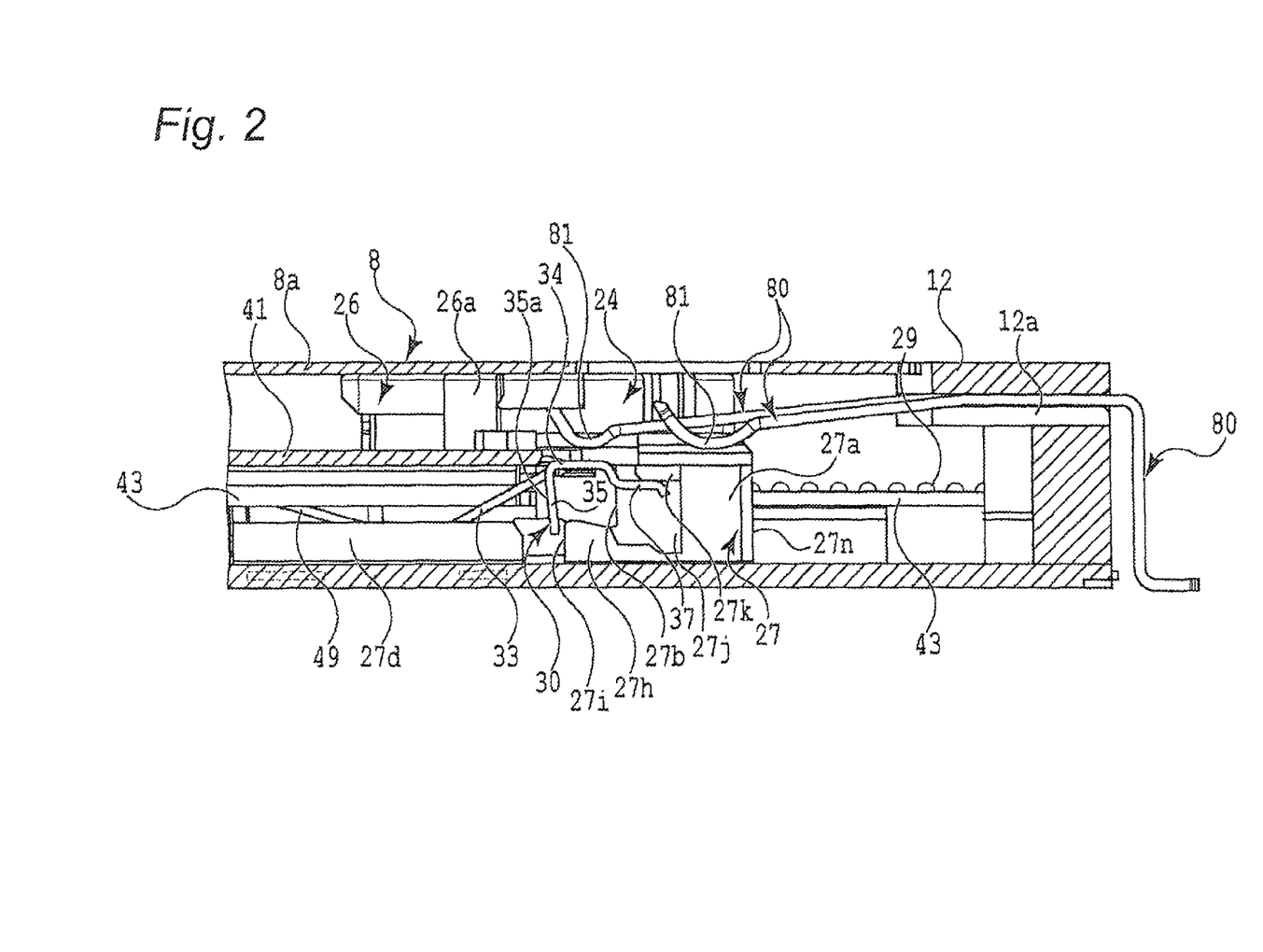
FIG. 2 is a main portion sectional view of the card connector taken along a line II-II in FIG. 1.

The partition plate 41 is flat and is arranged, when assembled into the card connector 1, in a first position that traverses the card accommodation space, as shown in FIG. 1. At this time, the partition plate 41 is arranged so that the height of the lower surface of the partition plate 41 from the bottom wall 11 becomes almost the same as or slightly larger than the thickness H20 of the second card 120. The partition plate 41, in the embodiment, is provided above the level of the paired spring receiving parts 42 and 43 provided on the opposite sides thereof. Such the constitution allows the small card 120 to be guided by vertical step portions connecting the opposite sides of the partition plate 41 to the paired spring receiving parts 42 and 43. Accordingly, the width of the partition plate 41 is almost the same as the width W of the small card 120. The partition plate 41, so as not to interfere with the first and second contacts 80 and 90 and the eject mechanism 20 even in case that the partition plate 41 moves up and down, is formed in such an appropriate form that a substantially rectangular front notch 41a is formed in the partition plate.

The paired elongate spring receiving parts 42 and 43 are provided on the laterally opposite sides of the partition plate 41 so as to correspond to a pair of pushup springs 49 and 49 (refer to FIG. 2) provided on the bottom wall 11, of the base 10 when assembled into the card connector. Accordingly, the paired spring, receiving parts 42 and 43 are urged upward by the paired pushup springs 49 and 49, with the result that the partition plate 41 is usually located in the first position where the partition plate 41 is pushed upward. In the embodiment, as described above, the paired spring receiving parts 42 and 43 are formed below the level of the partition plate 41, and formed so that the left spring part 43 is located below the card contacting member 25. The combined length of the partition plate 41 and the paired spring receiving parts 42 and 43 provided on the laterally opposite sides of the partition plate 41, that is, the combined width of them is set so as to become almost equal to the width of the first card 110.

On the outside of each of the paired elongate spring receiving parts 42 and 43, a vertical guide piece (in FIG. 1, only a vertical guide piece 43a formed on the spring receiving part 43 is shown) is provided so as to be orthogonal to each of the paired elongate spring receiving parts 42 and 43. The vertical guide piece 43a is provided at an appropriate position in the front-back direction of each of the paired elongate spring receiving parts 42 and 43. The vertical guide piece 43a moves along the inner wall surface (which faces the card accommodation space) of each of the right sidewall 13 and the left sidewall 14 of the base 10, thereby to guide the upward and downward movement of the partition plate 41. The vertical guide pieces 43a, by setting their heights appropriately, can regulate the upward movement of the partition plate 41 together with the paired regulation pieces 46 and 47 described later. Namely, the vertical guide pieces 43a and the paired regulation pieces 46 and 47 regulate the upward movement of the partition plate 41 so that the partition plate 41 does riot move above the first position which is on the same level with the thickness H20 of the second card 120.

At rear end portions of the paired elongate spring receiving parts 42 and 43, the paired driving pieces 44 and 45 are provided so as to extend rearward from the respective rear end portions of the paired elongate spring receiving parts 42 and 43. The paired driving pieces 44 and 45 extend from the rear end portions from the paired elongate spring receiving parts 42 and 43 by a predetermined length so as to allow engagement with an actuator 60 described later when, the actuator 60 rotates. With rotation of the actuator 60, the paired driving pieces 44 and 45 engage with a pair of engaging recess portions (not shown) formed in the actuator 60. Thereafter, by further rotation of the actuator 60, the paired driving pieces 44 and 45 are pushed down against the urging force of the pushup springs 49 and 49. Hereby, the partition plate 41 slants so as to descend rearward, and therefore, when the first card 110 reaches the rear end of the partition plate 41, the first card 110 can be guided, on the partition plate 41. Thereafter, the first card 110 is also guided into the card accommodation space by the vertical guide piece 43a, and a partition member 40 whole is pushed down by the first card 110 thereby to move to the second position parallel to the bottom wall 11.

At front end portions of the paired elongate spring receiving parts 42 and 43, the paired regulation pieces 46 and 47 are provided so as to extend upward from the respective front end portions of the elongate spring receiving parts 42 and 43. The paired regulation pieces 46 and 47 are bent so as to be orthogonal to the paired elongate spring receiving parts 42 and 43. The paired regulation pieces 46 and 47, for example, by moving along the inner wall surface (which faces the card accommodation space) of the front wall 12, guides the upward-downward movement of the partition member 40, while regulating the upward movement of the partition member 40.

Subsequently, the actuator 60 will be described, which inhibits insertion of cards other than the first card 110 and which, when the first card 110 is inserted into the card connector, slats the above partition plate 41 thereby to guide the first card 110 to a predetermined position in the card accommodation space.

The actuator 60 includes a shutter 61, a pair of projecting pins 62 (in FIG. 1, only a right-side projecting pin 62 is shown), a pair of legs 65 (In FIG. 1, only a left-side leg 65 is shown), and a pair of rotating shafts (not shown). The actuator 60 is arranged across the card accommodation space so as to be rotatable in the card accommodation space. Further, the actuator 60 includes a passage opening formed by the shutter 61 and the paired legs 65 and having a substantially rectangular vertical cross section. The second card 120 can pass through the passage opening.

The shutter 61, when the IC card has not been attached into the card connector as shown in FIG. 1, is arranged so as to extend orthogonally to a card insertion direction to laterally traverse the card accommodation space, thus covering the upper portion of the card accommodation space. On laterally opposite sides of the shutter 61, the paired projecting pins 62 are formed so as to project into the corresponding right and left rear accommodation grooves 13a and 14a. The paired projecting pins 62, when the IC card has not been attached into the card connector as shown in FIG. 1, engage with the corresponding openings 54 in the paired lock brackets 50 as described above.

On the laterally opposing sides of the shutter 61, and inside the paired projecting pins 62, the paired legs 65 are provided so as to face downward. By the shutter 61 and the paired legs 65, the passage opening having the substantially rectangular vertical cross section is formed (refer to FIG. 1). The shape of the vertical cross section of the passage opening is set almost as large as or slightly larger than the shape of the vertical cross section of the second card 120. Namely, the distance between the paired legs 65 is the same as the width W20 of the second card 120, and hereby substantially the same as the distance between the paired lower-stage guide paths 17. Engaging recess portions (not shown) are formed respectively on the front surface side of the paired legs 65. The paired engaging, recess portions, when the actuator 60 rotates, engage with the paired driving pieces 44 and 45 of the partition plate 41, push down the paired driving pieces 44 and 45, and resultantly push down the rear end portion of the partition plate 41.

At the lower ends of the paired legs 65, the paired rotating shafts (not shown) are formed respectively, projecting from the lower ends to the lateral outside. The paired rotating shafts are arranged respectively in the rear accommodation grooves 13a and 14a of the right and left sidewalls 13 and 14, traverse the bottom portions of the rear accommodation grooves 13a and 1a, and are supported rotatably by the right and left sidewalls 13 and 14. A torsion coil spring (not shown) is wound around one or both of the paired rotating shafts. The torsion coil spring urges the shutter 61 of the actuator 60 to an upright position as shown in FIG. 1, that is, a first position where the shutter 61 closes the card accommodation space.

The actuator 60 is usually, as shown in FIG. 1, located in the first position where the shutter 61 thereof closes partially the card accommodation space. As described later, when the first card 110 has been inserted into the card connector, the actuator 60 is disengaged from the lock brackets 50 and put in a rotatable state around the rotating shafts. When the first card 110 is further inserted, the shutter 61 abuts on the first card 110, whereby the actuator 60 is pushed down forward while being rotated, and moves rotationally to a second position where the shutter 61 opens the card accommodation space. Furthermore, when the second card 120 has been inserted into the card connector, the second card 120 passes through the passage opening formed in the actuator 60 without rotation of the actuator 60.

The card connector 1 according to the invention has the above constitution. An operation of selectively attaching the IC card into the card connector 1 according to the invention will be described below in detail. First, an operation of attaching the first card 110 into the card connector 1 according to the invention will be described.

As shown in FIGS. 1 and 2, when the first card 110 is not attached into the card connector, all of the lock bracket 50, actuator 60 and partition plate 41 of the card connector 1 are located in the respective first positions. Specifically, the lock brackets 50 are located in the first position where the paired contact portions 52 of the lock brackets 50 are closed, and the actuator 60 is located in the first position where the shutter 61 of the actuator 60 closes partially the card accommodation space. At this time, the paired openings 54 in the paired lock brackets 50 engage with the paired projecting pins 62 of the actuator 60. Further, the partition plate 41 is located in the first position where the partition plate 41 is substantially parallel to the bottom wall 11 of the base 10 and the height of the partition plate 41 from the bottom wall 11 is almost the same as the thickness of the second card 120. Further, regarding the movable metal member 30, the moving piece 34 and the contacting piece 35 thereof are located in the up-position as, the first position.

The first card 110 is about to be inserted from the card insertion slot 5 into the card connector in the reverse state where the surface with the pads 114 formed thereon is faced upward. Namely, the first card 110 is about to be inserted from the insertion slot 5 so that the wide upper body 111 of the first card 110 moves along the middle-stage guide path 16 and the narrow lower body 112 of the first card 110 moves, along the upper-stage guide path 15.

When the first card 110 is inserted forward, the wide upper body 111, through the opening (not shown) in the middle-stage guide path 16, comes into contact with the paired contact portions 52 of the paired lock brackets 50 projecting into the card accommodation space. This contact causes the paired contact portions 52 to be simultaneously retracted from the card accommodation space. Namely, the paired, contact portions 52 are moved to the second position. Hereby, the paired elastic deformation pieces 51 of the paired lock brackets 50 are opened (moved to the second position), and simultaneously the paired openings 54 of the paired elastic deformation pieces 51 disengage from the paired projecting pins 62 of the actuator 60. Accordingly, the actuator 60 is put in the rotatable state.

When the first card 110 is further inserted from this state and moves forward, the leading end of the first card 110 abuts on the shutter 61 of the actuator 60. At this time, as described above, the actuator 60 is under the rotatable state. Accordingly, with the forward movement of the first card 110, the actuator 60, against the urging force of the torsion coil spring, rotates so as to be pushed down forward. During the rotation of the actuator 60, the engaging recess portions (not shown) provided in the paired legs 65 of the actuator 60 engage with the paired lateral driving pieces 44 and 45 of the partition plate 41.

When the first card 110 is further inserted, the actuator 60 rotates to the second position where the actuator 60 is completely brought down, and the upper portion of the card accommodation space is opened so that the first card 110 can pass through the upper portion. Hereby, the first card 110 moves forward over the shutter 61 of the actuator 60.

At this time, the rotation of the actuator 60 up to the second position pushes down the paired driving pieces 44 and 45 sufficiently and slants the partition plate 41. Namely, the rear end portion of the partition plate 41 is pushed down. Accordingly, the leading end of the first card 110 is in a state where it can get onto the rear end portion of the partition plate 41.

Figure 3A:
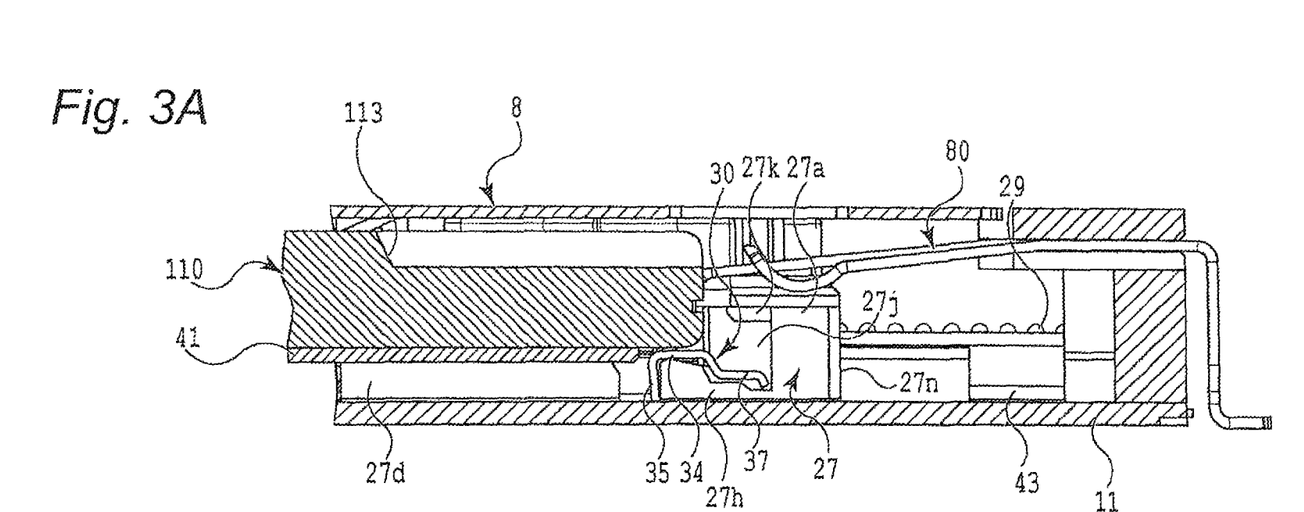

When the first card 110 is further inserted from this state, with the forward movement of the first card 110, the partition plate 41 is pushed down to the position where the partition plate 41 becomes parallel to the upper surface of the bottom wall 11 of the base 10, that is, to the second position. By such the push-down of the partition plate 41, the elastic deformation piece 33 of the movable metal member 30 arranged below the partition plate 41 deforms, and the moving piece 34 and contacting piece 35 of the movable metal piece 30 move downward. The movable metal member 30 moves downward to the second position where the moving piece 34 abuts on the upper surface of the receiver 27h of the second card contacting member 27. Accordingly, as shown in FIG. 3A, the card front end surface 117 of the first card 110 can abut on the first card pressing surface 27b of the second card contacting member 27 constituting the card contacting member 25 of the eject mechanism 20. At this time, the inclined surface 116 as the notch portion of the first card 110 abuts on the inclined surface 26a of the first card contacting member 26 and the inclined surface 27c of the second card contacting member 27. Hereby, the first card 110 is further pushed in forward against the urging force of the compression coil spring 29 of the eject mechanism 20, and pushed in, as shown in FIG. 3B, until the front end surface 27n of the second card contacting member 27 reaches the front wall 12 of the base 10.

Figure 3B:
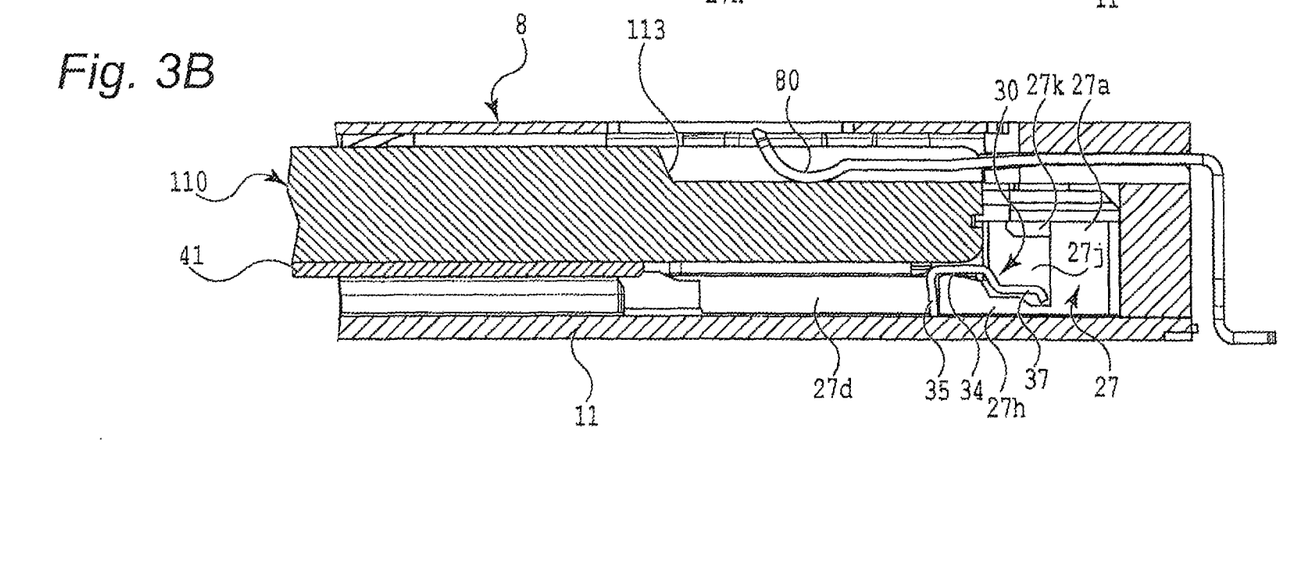

In the state shown in FIG. 3B, when the force of pushing-in the first card 110 is removed, the first card 110 is held in the card accommodation space of the card connector 1 in a state where the first card 110 has been slightly pushed back by the action of the push-push eject mechanism 20. At this time, the plural pads 114 of the first card 110 can come into contact with the corresponding plural first contacts 80 respectively.

The first card 110, as described above, pushes down the partition plate 41 located in the card accommodation space up to the second position against the urging force of the paired pushup springs 49 located between the card 110 and the bottom wall 11 through the partition plate 41. In other words, the partition plate 41 comes into contact with the surface of the upper body 111, of the, first card 110, is located in the second position parallel to the bottom wall 11, and pushes the first card 110 upward. Accordingly, the plural pads 114 of the first card 110 Can come into electric contact with the corresponding plural first contacts 80 at the appropriate contact pressure, respectively. When the first card 110 has been attached into the card accommodation space of the card connector 1, the surface of the upper body 111 of the first card 110 may come into contact with the plural second contacts 90 for the second card 120. This constitution does riot affect the first card 110 because no pad is formed on the surface of the upper body 111 of the first card 110 and because the surface of the upper body 111 is not electrically conductive. Rather, the contact between the surface of the upper body 111 and the plural second contacts 90 increases the contact pressure between the first card 110 and the first contacts 80. Therefore, the repulsive force of these contacts can be utilized.

Even in case that an IC card beyond the scope of assumption, which has the same width as the width of the upper body 111 of the first card 110, has been inserted into the middle-stage guide path 16, since the IC card, abuts on the inclined surface 26a of the first card contacting member 26 and the inclined surface 27c of the second card contacting member 27, the forward movement of the IC card to the predetermined position is prevented. Further, even if the first card 110 is to be inserted into the card connector back to front, the insertion of the first card is prevented by the lower-stage guide path 17.

When the first card 110 is detached from the card connector 1, the first card 110 located in a slightly retreating position from the state of FIG. 3B is pushed in again up to the state of FIG. 3B. Subsequently, in the state of FIG. 3B, the force of pushing-in the first card 110 is released. Hereby, the first card 110 is discharged from the card, connector 1 by the action of the eject mechanism 20. All of the movable metal member 30, the partition member 40, the lock brackets 50 and the actuator 60 return the respective first positions.

Figure 4A:
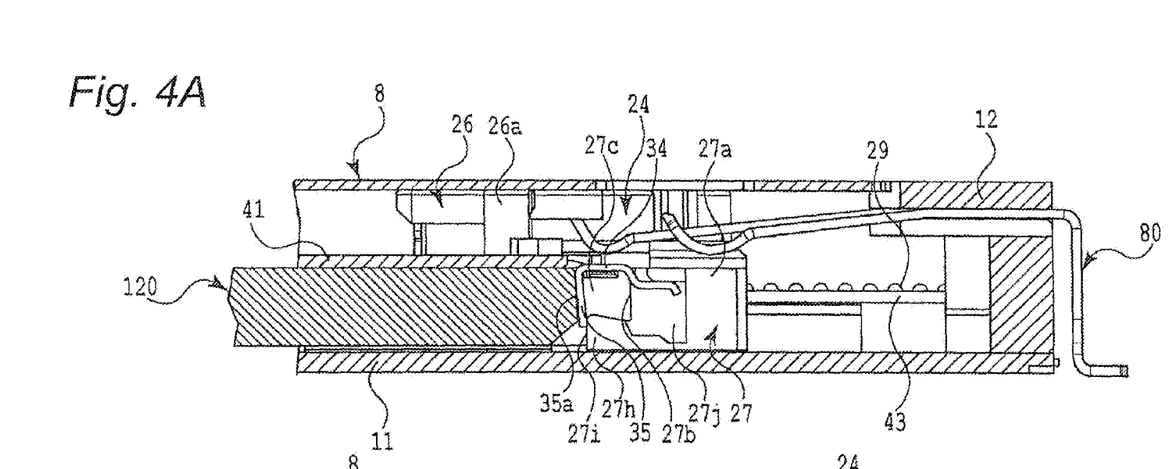
Figure 4B:
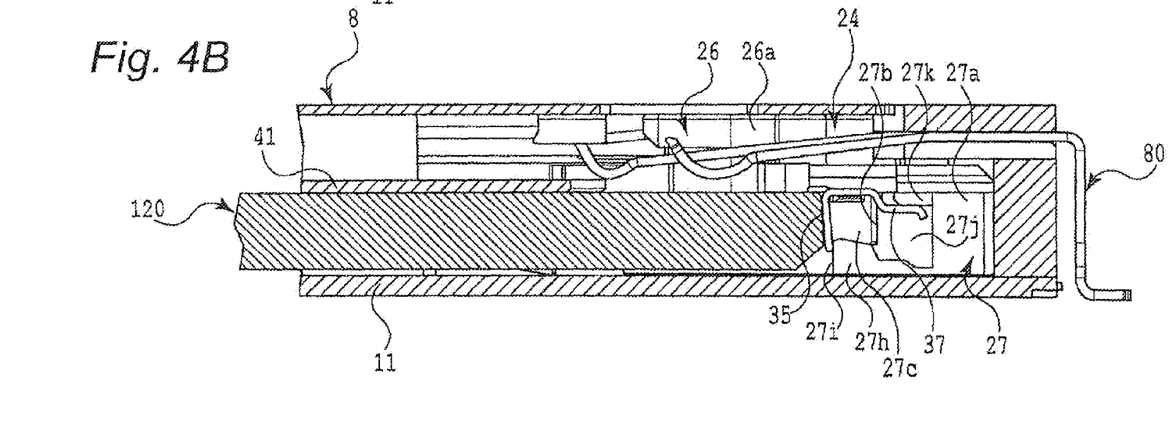

Next, an operation, of attaching the second card 120 into the card connector 1 according to the invention will be described with reference to FIGS. 4A and 4B.

The second card 120 is about to be inserted from the card insertion slot 5 into the card connector 1 along the lower-stage guide path 17 in the normal state where the surface of the second card 120 with the pads 123 formed thereon is faced downward. Since the insertion of the second card 120 is guided along the lower-stage guide path 17, the second card does not come into contact with the lock brackets 50. Thus, the actuator 60 is still located in the first position. However, since the second card 120 can pass through the passage opening provided in the actuator 60, it can move forward in the card accommodation space without being interfered with. Further, since the partition plate 41 is also located in the first position the height of which is larger than the thickness H20 of the second card 120, the second card 120 can be inserted into the card accommodation space located under the partition plate 41.

When the second card 120 further moves forward in the space under the partition plate 41, the rear part 27d2 of the supporting body 27d of the second card contacting member 27 and the supporting piece 32 of the movable metal member 30 which is fixed to the rear part 27d2 are accommodated into the dummy groove 125 provided in the second card 120.

However, as described above, the elastic deformation piece 33 constituting the movable metal member 30 is formed so as not to come into contact with the second card 120 in cooperation with the inclined surface 124 as the notch portion provided in the second card 120. Hereby, the card front end surface 127 of the second card 120, since the elastic deformation piece 33 of the movable metal piece 30 does not deform, can abut on the second card pressing surface 35a of the movable metal member 30 which is located in the first position of the up-position as shown in FIG. 4A.

Since the subsequent attaching operation of the second card 120 is the same as that of the first card 110, the description of the subsequent operation will be omitted. Further, similarly to in case of the first card 110, when the second card 120 has been attached into the card connector, the upper surface (the surface with no pad formed) of the second card 120 may come into contact with the plural first contacts 80 for the first card 110.

Even if the second card 120 is mistakenly inserted along the middle-stage guide path 16, the small width of the second card 120 precludes the paired contact portions 52 of the paired lock brackets 50 from being simultaneously moved to the second position. Therefore, the actuator 60 is not put in the rotatable state, so that the second card 120 is inhibited from being inserted forward beyond the shutter member 61 of the actuator 60. This prevents the second card 120, the card connector 1, and further an electronic device connected through the card connector 1 from being damaged. Further, in case that the second card 120 has been inserted into the lower-stage guide path 17 back to front, the rear, end surface of the second card 120 abuts on the rear end surface 27e of the supporting body 27d of the second card contacting member 27, and therefore the forward movement of the second card 120 up to the predetermined position can be prevented. Alternatively, also in case that a card beyond the scope of assumption, which has the same width as the width of the second card 120, has been inserted into the lower-stage guide path 17, the front end surface of the card beyond the scope of assumption abuts on the rear end surface 27e of the supporting body 27d of the second card contacting member 27, and thus the forward movement of the card up to the predetermined position is prevented.

In the embodiment, the card connector 1 is so formed that the first, card 110 is attached in the reverse state and the second card is attached in the normal state. However, the invention is not limited to this. It is also possible for those skilled in the art to form the card connector so that both of the first card 110 and the second card 120 can be attached in the normal state. In this case, the first card contacting member 26 constituting the card contacting member 25 and the inclined surface 27c formed on the second card contacting member 27 are omitted.

While the present inventive concept has been shown and described with reference to certain; exemplary embodiments thereof, it will be understood by those skilled in the art that various changes in form and details may be made therein without departing from the spirit and scope of the invention as defined by the appended claims.

What is claimed is:

1. A card connector in which a base and a cover form a card accommodation space having a card insertion slot and in which either of a first card and a second card is selectively accommodated in the card accommodation space, comprising:

a plurality of contacts including a plurality of first contacts for the first card and a plurality of second contacts for the second card;

a partition plate configured to partition the card accommodation space up and down, and to be moved upward and downward in the card accommodation space in response to insertion and discharge of the first card; and an eject mechanism provided movably in the card connector in the front-back direction, wherein:

the eject mechanism includes at least an eject member configured to slide in the card connector in the front-back direction, a card contacting member which is coupled to the ejected member and has a first card pressing surface that abuts on a front end surface of the first card, and a movable metal member which is attached to the card contacting member and has a second card pressing surface that abuts on a front end surface of the second card;

the second card pressing surface is arranged at the rear of the first card pressing surface;

the second card pressing surface is configured to be moved between a first position of a up-position and a second position of a down-position in response to moving-down and moving-up of the partition plate caused by inserting and discharging of the first card; and the movable metal member, when the second card pressing surface is located in the first position, is formed so as to cover at least a part of the first card pressing surface.

2. The card connector according to claim 1, wherein the second card is shorter, narrower, and thinner than the first card.

3. The card connector according to claim 1, wherein the card contacting member includes: a main body on which the first card pressing surface is formed; and a supporting body configured to extend rearward from the main body and to fixedly support the movable metal member thereon.

4. The card connector according to claim 3, wherein a receiver having a slide surface is formed on the main body of the card contacting member, the movable metal member includes: a fixing piece and a supporting piece configured to fix and support the movable metal member onto the supporting body; an elastic deformation piece which is supported by the supporting piece in ah elastically deformable manner; a moving piece which is connected to the elastic deformation piece and formed so as to cover at least a part of the first card pressing surface formed on the main body together with the elastic deformation piece, seen from the rear side; and an contacting piece which is provided at the rear of the moving piece and is configured to slide on the slide surface of the receiver; and the second card pressing surface is formed on the contacting piece of the movable metal member.

5. The card connector according to claim 4, wherein a dummy groove which opens at least forward and downward is formed in the second card, and a part of the supporting body of the card contacting member and the supporting piece of the movable metal member are formed so as to be accommodated in the dummy groove of the second card.

* * * * *